(12) United States Patent
Goodman et al.

(10) Patent No.: US 7,409,708 B2
(45) Date of Patent: Aug. 5, 2008

(54) ADVANCED URL AND IP FEATURES

(75) Inventors: Joshua T Goodman, Redmond, WA (US); Robert L Rounthwaite, Fall City, WA (US); Geoffrey J Hulten, Seattle, WA (US); John A Deurbrouck, Redmond, WA (US); Manav Mishra, Kirkland, WA (US); Anthony P Penta, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 10/856,978

(22) Filed: May 28, 2004

(65) Prior Publication Data

US 2005/0022031 A1    Jan. 27, 2005

Related U.S. Application Data

(63) Continuation-in-part of application No. 10/454,168, filed on Jun. 4, 2003, now Pat. No. 7,272,853.

(51) Int. Cl.
*H04L 29/00* (2006.01)
(52) U.S. Cl. ........................................................ 726/13
(58) Field of Classification Search .................... 726/13
See application file for complete search history.

(56) References Cited

U.S. PATENT DOCUMENTS

| 5,377,354 | A | 12/1994 | Scannell et al. |
|---|---|---|---|
| 5,619,648 | A | 4/1997 | Canale et al. |
| 5,638,487 | A | 6/1997 | Chigier |
| 5,704,017 | A | 12/1997 | Heckerman et al. |
| 5,805,801 | A | 9/1998 | Holloway et al. |
| 5,835,087 | A | 11/1998 | Herz et al. |
| 5,884,033 | A | 3/1999 | Duvall et al. |
| 5,905,859 | A | 5/1999 | Holloway et al. |
| 6,003,027 | A | 12/1999 | Prager |
| 6,023,723 | A | 2/2000 | McCormick et al. |
| 6,047,242 | A | 4/2000 | Benson |
| 6,052,709 | A | 4/2000 | Paul |

(Continued)

FOREIGN PATENT DOCUMENTS

EP            413 537            2/1991

(Continued)

OTHER PUBLICATIONS

Federal Trade Commission. "False Claims in Spam", A report by the FTC's division of marketing practices, Apr. 30, 2003, http://www.ftc.gov/reports/spam/030429spamreport.pdf.

(Continued)

*Primary Examiner*—Matthew B Smithers
(74) *Attorney, Agent, or Firm*—Amin, Turocy & Calvin, LLP

(57) ABSTRACT

Disclosed are systems and methods that facilitate spam detection and prevention at least in part by building or training filters using advanced IP address and/or URL features in connection with machine learning techniques. A variety of advanced IP address related features can be generated from performing a reverse IP lookup. Similarly, many different advanced URL based features can be created from analyzing at least a portion of any one URL detected in a message.

36 Claims, 10 Drawing Sheets

U.S. PATENT DOCUMENTS

| | | |
|---|---|---|
| 6,072,942 A | 6/2000 | Stockwell et al. |
| 6,101,531 A | 8/2000 | Eggleston et al. |
| 6,112,227 A | 8/2000 | Heiner |
| 6,122,657 A | 9/2000 | Hoffman, Jr. et al. |
| 6,161,130 A | 12/2000 | Horvitz et al. |
| 6,167,434 A | 12/2000 | Pang |
| 6,192,360 B1 | 2/2001 | Dumais et al. |
| 6,199,102 B1 | 3/2001 | Cobb |
| 6,266,692 B1 | 7/2001 | Greenstein |
| 6,308,273 B1 | 10/2001 | Goertzel et al. |
| 6,314,421 B1 | 11/2001 | Sharnoff et al. |
| 6,321,267 B1 | 11/2001 | Donaldson |
| 6,327,617 B1 | 12/2001 | Fawcett |
| 6,330,590 B1 | 12/2001 | Cotten |
| 6,370,526 B1 | 4/2002 | Agrawal et al. |
| 6,393,465 B2 | 5/2002 | Leeds |
| 6,421,709 B1 | 7/2002 | McCormick et al. |
| 6,424,997 B1 | 7/2002 | Buskirk, Jr. et al. |
| 6,434,600 B2 | 8/2002 | Waite et al. |
| 6,453,327 B1 | 9/2002 | Nielsen |
| 6,477,551 B1 | 11/2002 | Johnson et al. |
| 6,484,197 B1 | 11/2002 | Donohue |
| 6,484,261 B1 | 11/2002 | Wiegel |
| 6,505,250 B2 | 1/2003 | Freund et al. |
| 6,546,416 B1 | 4/2003 | Kirsch |
| 6,592,627 B1 | 7/2003 | Agrawal et al. |
| 6,615,242 B1 | 9/2003 | Riemers |
| 6,633,855 B1 | 10/2003 | Auvenshine |
| 6,643,686 B1 | 11/2003 | Hall |
| 6,654,787 B1 * | 11/2003 | Aronson et al. ............. 709/206 |
| 6,684,201 B1 | 1/2004 | Brill et al. |
| 6,691,156 B1 | 2/2004 | Drummond et al. |
| 6,701,350 B1 | 3/2004 | Mitchell |
| 6,701,440 B1 | 3/2004 | Kim et al. |
| 6,728,690 B1 | 4/2004 | Meek et al. |
| 6,732,149 B1 | 5/2004 | Kephart |
| 6,732,157 B1 | 5/2004 | Gordon et al. |
| 6,732,273 B1 | 5/2004 | Byers |
| 6,742,047 B1 | 5/2004 | Tso |
| 6,748,422 B2 | 6/2004 | Morin et al. |
| 6,751,348 B2 | 6/2004 | Buzuloiu et al. |
| 6,757,830 B1 | 6/2004 | Tarbotton et al. |
| 6,768,991 B2 | 7/2004 | Hearnden |
| 6,775,704 B1 | 8/2004 | Watson et al. |
| 6,779,021 B1 | 8/2004 | Bates et al. |
| 6,785,820 B1 | 8/2004 | Muttik |
| 6,842,773 B1 | 1/2005 | Ralston et al. |
| 6,853,749 B2 | 2/2005 | Watanabe et al. |
| 6,915,334 B1 | 7/2005 | Hall |
| 6,920,477 B2 | 7/2005 | Mitzenmacher |
| 6,928,465 B2 | 8/2005 | Earnest |
| 6,971,023 B1 | 11/2005 | Makinson et al. |
| 7,003,555 B1 | 2/2006 | Jungck |
| 7,032,030 B1 | 4/2006 | Codignotto |
| 7,051,077 B2 | 5/2006 | Lin |
| 7,117,358 B2 | 10/2006 | Bandini et al. |
| 7,155,243 B2 | 12/2006 | Baldwin et al. |
| 7,155,484 B2 | 12/2006 | Malik |
| 7,188,369 B2 | 3/2007 | Ho et al. |
| 7,219,148 B2 | 5/2007 | Rounthwaite et al. |
| 7,263,607 B2 * | 8/2007 | Ingerman et al. ............. 713/150 |
| 7,293,063 B1 | 11/2007 | Sobel |
| 2001/0046307 A1 | 11/2001 | Wong |
| 2002/0016956 A1 | 2/2002 | Fawcett |
| 2002/0059425 A1 | 5/2002 | Belfiore et al. |
| 2002/0073157 A1 | 6/2002 | Newman et al. |
| 2002/0091738 A1 | 7/2002 | Rohrabaugh et al. |
| 2002/0124025 A1 | 9/2002 | Janakiraman et al. |
| 2002/0147782 A1 | 10/2002 | Dimitrova et al. |
| 2002/0174185 A1 | 11/2002 | Rawat et al. |
| 2002/0184315 A1 | 12/2002 | Earnest |
| 2002/0199095 A1 | 12/2002 | Bandini et al. |
| 2003/0009495 A1 | 1/2003 | Adjaoute |
| 2003/0009698 A1 | 1/2003 | Lindeman et al. |
| 2003/0016872 A1 | 1/2003 | Sun |
| 2003/0037074 A1 | 2/2003 | Dwork et al. |
| 2003/0041126 A1 | 2/2003 | Buford et al. |
| 2003/0088627 A1 | 5/2003 | Rothwell et al. |
| 2003/0149733 A1 | 8/2003 | Capiel |
| 2003/0167311 A1 | 9/2003 | Kirsch |
| 2003/0191969 A1 | 10/2003 | Katsikas |
| 2003/0204569 A1 | 10/2003 | Andrews et al. |
| 2003/0320054 | 10/2003 | Cheng et al. |
| 2003/0229672 A1 | 12/2003 | Kohn |
| 2004/0003283 A1 | 1/2004 | Goodman et al. |
| 2004/0015554 A1 | 1/2004 | Wilson |
| 2004/0054887 A1 | 3/2004 | Paulsen et al. |
| 2004/0073617 A1 | 4/2004 | Milliken et al. |
| 2004/0083270 A1 * | 4/2004 | Heckerman et al. ......... 709/207 |
| 2004/0093371 A1 | 5/2004 | Burrows et al. |
| 2004/0139160 A1 | 7/2004 | Wallace et al. |
| 2004/0139165 A1 | 7/2004 | McMillan et al. |
| 2004/0148330 A1 * | 7/2004 | Alspector et al. ........... 709/200 |
| 2004/0177120 A1 | 9/2004 | Kirsch |
| 2004/0199585 A1 | 10/2004 | Wang |
| 2004/0199594 A1 | 10/2004 | Radatti et al. |
| 2004/0210640 A1 | 10/2004 | Chadwick et al. |
| 2004/0255122 A1 | 12/2004 | Ingerman et al. |
| 2004/0260776 A1 | 12/2004 | Starbuck et al. |
| 2005/0015455 A1 | 1/2005 | Liu |
| 2005/0050150 A1 | 3/2005 | Dinkin |
| 2005/0060643 A1 | 3/2005 | Glass et al. |
| 2005/0076084 A1 | 4/2005 | Loughmiller et al. |
| 2005/0080855 A1 | 4/2005 | Murray |
| 2005/0080889 A1 | 4/2005 | Malik et al. |
| 2005/0081059 A1 | 4/2005 | Bandini et al. |
| 2005/0091321 A1 | 4/2005 | Daniell et al. |
| 2005/0097174 A1 | 5/2005 | Daniell |
| 2005/0114452 A1 | 5/2005 | Prakash |
| 2005/0120019 A1 | 6/2005 | Rigoutsos et al. |
| 2005/0159136 A1 | 7/2005 | Rouse et al. |
| 2005/0160148 A1 | 7/2005 | Yu |
| 2005/0165895 A1 | 7/2005 | Rajan et al. |
| 2005/0182735 A1 | 8/2005 | Zager et al. |
| 2005/0188023 A1 | 8/2005 | Doan et al. |
| 2005/0204159 A1 | 9/2005 | Davis et al. |
| 2006/0031303 A1 | 2/2006 | Pang |
| 2006/0031306 A1 | 2/2006 | Haverkos |
| 2006/0036701 A1 | 2/2006 | Bulfer et al. |
| 2006/0123083 A1 | 6/2006 | Goutte et al. |
| 2006/0265498 A1 | 11/2006 | Turgeman et al. |
| 2007/0130350 A1 | 6/2007 | Alperovitch et al. |
| 2007/0130351 A1 | 6/2007 | Alperovitch et al. |
| 2007/0133034 A1 | 6/2007 | Jindal et al. |

FOREIGN PATENT DOCUMENTS

| | | |
|---|---|---|
| EP | 720 333 | 7/1996 |
| EP | 1376427 | 3/2003 |
| EP | 1376427 A2 | 1/2004 |
| EP | 1376427 A3 | 1/2004 |
| WO | WO 96/35994 | 11/1996 |
| WO | 9967731 | 12/1999 |
| WO | WO 02/071286 | 9/2002 |
| WO | 2003054764 | 7/2003 |
| WO | WO 2004/059506 | 7/2004 |

OTHER PUBLICATIONS

Hansell. "Internet is losing ground in battle against spam", The New York Times: Technology section, Apr. 22, 2003.
European Search report dated Feb. 23, 2007, mailed Feb. 28, 2007 for European Patent Application Serial No. 05105308, 4 pages.
European Search Report dated Jul. 5, 2006, mailed Jul. 24, 2006 for European Application No. EP 06 01 2631, 3 pages.

European Search Report dated Apr. 6, 2006 and mailed Apr. 6, 2006 for EP 04102242, 3 pages.
Graham. "The Future of SPAM" (2003) Computer Journal, CSI Computer Security Institute, vol. 19, No. 1, 6 pages.
International Search Report dated Jan. 17, 2006, mailed Jan. 31, 2006, for PCT Application Serial No. PCT/US04/05501, 2 pages.
Written Opinion of the Internatioanl Preliminary Examining Authority mailed Nov. 30, 2005 for PCT/US03/41526, 5 pages.
U.S. Appl. No. 10/208,150, filed Jul. 29, 2002, Anduker.
U.S. Appl. No. 09/893,2001, filed Jun. 28, 2001, Horvitz.
U.S. Appl. No. 10/278,591, filed Oct. 23, 2002, Heckerman.
U.S. Appl. No. 10/180,565, filed Jun. 26, 2002, Goodman.
U.S. Appl. No. 09/497,992, filed Feb. 4, 2000, Maller.
U.S. Appl. No. 10/291,260, filed Nov. 8, 2002, Burrows.
Breiman, Friedman, Olshen, and Stone. "Classification and Regression Trees." Wadsworth & Brooks, Monterey, CA (1984).
Quinlan. "c4.5: Programs for Machine Learning." Morgan Kaufmann, San Francisco, CA (1993).
Hayes, Brian. "Spam, Spam, Spam, Lovely Spam." American Scientist Online, Jun. 30, 2003. pp. 1-6. vol. 91.
Partial European Search Report, EP05100847, mailed Jun. 21, 2005, 5 pages.
European Search Report, dated Jun. 9, 2005, mailed Aug. 22, 2005 for European Patent Application Serial No. EP04011978, 12 pages.
Yu Wu, et al., A New Anti-Spam Filter Based on Data Mining and Analysis of Email Security, Conference Proceedings of the SPIE, Data Mining and Knowledge Discovery Theory, Tools and Technology V, vol. 5098, Apr. 21, 2003, pp. 147-154, Orlando, FL, USA.
Massey, B., et al., Learning Spam: Simple Techniques for Freely-Available Software, Proceedings of Freenix Track 2003 Usenix Annual Technical Conference, Online!, Jun. 9, 2003, pp. 63-76, Berkley, CA USA.
Graham, P., The Future of Spam, Computer Security Journal, CSI Computer Security Institute, vol. 19, No. 1, Jan. 2003, pp. 1-5.
Graham, P., A Plan for Spam, Online!, Aug. 2002, XP002273602, http://www.paulgraham.com/spam.html, retrieved on Mar. 12, 2004.
European Search Report, EP31087TE900, mailed Nov. 11, 2004.
J. Byrne, My Spamblock, Google, Jan. 19, 1997, 2 pages.
D. F. Skoll, How to Make Sure a Human is Sending You Mail, Google, Nov. 17, 1996, 2 pages.
L.M. Bowman, Hotmail Spam Filters Block Ougoing E-Mail, CNET NEWS.COM, Jan. 18, 2001, 3 pages.
Cynthia Dwork, et al.; "Pricing Via Processing or Combatting Junk Mail"; Presented at Crypto '92; pp. 1-11.
Thorsten Joachims; "Text Catergorization with Support Vector Machines: Learning with Many Relevant Features"; LS-8 Report 23, Nov. 1997, 18 pages.
Daphne Koller, et al.; "Hierarchically Classifying Doucments Using Very Few Words"; In ICML-97: Proceedings of the Fourteenth International Conference on Machine Learning; San Francisco, CA: Morgan Kaufmann 1997; 9 pages.
Ellen Spertus; "Smokey: Automatic Recognition of Hostile Messages"; Proceedings of the Conference on Innovative Applications in Artificial Intelligence (IAAI), 1997, 8 pages.
Hinrich Schutze, et al.; "A Comparison of Classifiers and Document Representations for the Routing Problem"; Proceedings of the 18th Annual International ACM SIGIR Conference on Research and Development in Information Retrieval, Seattle, WA, Jul. 9-13, 1995; pp. 229-237.
Yiming Yang, et al.; "A Comparative Study on Feature Selection in Text Categorization"; School of Computer Science, Carnegie Mellon University, Pittsburgh, PA, and Verity, Inc., Sunnyvale, CA; 9 pages.
David D. Lewis, et al.; "A Comparison of Two Learning Algorithms for Text Categorization"; Third Annual Symposium on Document Analysis and Information Retrieval; Apr. 11-13, 1994; pp. 81-93.
Mehran Sahami; "Learning Limited Dependence Bayesian Classifiers"; In KDD-96: Proceedings of the Second International Conference on Knowledge Discovery and Data Mining; AAAI Press, 1996; Menlo Park, CA; pp. 335-338.
William W. Cohen; "Learning Rules that Classify E-Mail"; In the Proceedings of the 1996 AAAI Spring Symposium on Machine Learning in Information Access. Downloaded from William Cohen's web page: http://www.research.att.com/nwcohen/pubs.html.

Makoto Iwayama, et al., Hierarchical Bayesian Clustering for Automatic Text Classification, Natural Language, 1995, pp. 1322-1327.
David D. Lewis, An Evaluation of Phrasal and Clustered Representations on a Text Categorization Task, 15th Annual International SIGIR '92, Denmark 1992, pp. 37-50.
Daphne Koller, et al, Toward Optimal Feature Selection, Machine Learning Proc. of the Thirteenth International Conference, Morgan Kaufmann, 1996, 9 pages.
David Dolan Lewis, Representation and Learning in Information Retrieval, University of Massachusetts, 1992.
Tom Mitchell, Machine Learning, Carnegie Mellon University, Bayesian Learning, Chapter 6, pp. 180-184.
Y. H. Li, et al., Classification of Text Documents, The Computer Journal, vol. 41, No. 8, 1998; pp. 537-546.
Juha Takkinen, et al., Cafe; A Conceptual Model for Managing Information in Electronic Mail, Laboratory for Intelligent Information Systems, Department of Computer and Information Science, Linkoping University, Sweden, Conference on System Sciences, 1998 IEEE.
Jacob Palme, et al., Issues When Designing Filters In Messaging Systems, Computer Communications, 1996, pp. 95-101, Stockholm, Sweden.
Richard B. Segal, et al., SwiftFile: An Intelligent Assistant for Organizing E-Mail, In Proceedings of the Third International Conference on Autonomous Agents, May 1999, 7 pages.
Mehran Sahami, et al., A Bayesian Approach to Filtering Junk E-Mail, AAAI Workshop on Learning for Text Categorization, Jul. 1998, 8 pages, Madison, Wisconsin, USA.
David Madigan, Statistics and The War on Spam, Rutgers University, pp. 1-13, 2003.
Padraig Cunningham, et al., A Case-Based Approach to Spam Filtering that Can Track Concept Drift, In The ICCBR'03 Workshop on Long-Lived CBR Systems, Jun. 2003, 9 pages, Trondheim, Norway.
Mark Rosen, E-mail Classification in the Haystack Framework, Massachusetts Institute of Technology, Feb. 2003, 103 pages.
Kevin R. Gee, Using Latent Semantic Indexing to Filter Spam, Dept. of Computer Science and Engineering, University of Texas-Arlington, 5 pages, 2003.
S. Argamon, et al., Routing documents according to style, In First International Workshop on Innovative Information Systems, 1998, 8 pages.
K. Mock, An Experimental Framework for Email Categorization and Management, Proceedings of the 24th Annual International ACM SIGIR Conference, 2001, pp. 392-393.
Jose Maria Gomez Hidalgo, Evaluating Cost-Sensitive Unsolicited Bulk Email Categorization, SAC 2002, 2002, pp. 615-620, Madrid, Spain.
A.Z. Broder, et al. Syntactic Clustering of the Web, SRC Technical Note, Digital Corporation, Jul. 25, 1997, 13 pages.
I. Androutsopoulos,et al., An Experimental Comparison of Naive Bayesian and Keyword-based Anti-spam Filtering with Personal E-mail Messages, Proceedings of the 23rd ACM SIGIR Conference, 2000, pp. 160-167.
J.D.M. Rennie. ifile: An Application of Machine Learning to E-Mail Filtering, Proceedings of the KDD-2000 Workshop on Text Mining, Sixth ACM SIGKDD International Conference on Knowledge Discovery and Data Mining, 2000. 6 pages.
P. Pantel, et al., SpamCop: A Spam Classification & Organization Program, In Poc. AAAI-1998 Workshop on Learning for Text Categorization, 1998, 8 pages.
G. Manco, et al., Towards and Adaptive Mail Classifier, In Proc. of Italian Association for Artificial Intelligence Workshop, 2002, 12 pages.
Cormac O'Brien, et al., Spam Filters: Bayes vs. Chi-squared; Letters vs. Words, Proceedings of the 1st international symposium on Information and communication technologies, 2003, pp. 291-296, Dublin, Ireland.
Olle Balter, et al., Bifrost Inbox Organizer: Giving users control over the inbox, NordiCHI Oct. 2002, 2002, pp. 111-118, Arhus, Denmark.
P.Y. Simard, et al., Using Character Recognition and Segmentation to Tell Computer from Humans, International Conference on Document Analysis and Recognition (ICDAR), IEEE Computer Society, 2000, pp. 418-423.

S. Li et al., Secure Human-Computer Identification against Peeping: A Survey, Microsoft Research, 2003, 53 pages.

D.A. Turner et al., Controlling Spam through Lightweight Currency, In Proc. of the Hawaii International Conference on Computer Sciences, Jan. 2004, 9 pages.

D. Turner et al., Payment-based Email, 5th International Conference on Software Engineering, Artificial Intelligence, Networking, and Parallel/Distributed Computing, Jun. 2004, 7 pages.

U.S. Appl. No. 10/809,163.

John Wong, Preventing Spams and Relays, Linux Journal, Dec. 1998, 6 pages, vol. 1998 Issue 56es, Specialized Systems Consultants, Inc.

Meng Weng Wong, SPF Overview, Linux Journal, Apr. 2004, 6 pages, vol. 2004 Issue 120, Specialized Systems Consultants, Inc.

Lorrie Faith Cranor, et al., Spam!, Communications of the ACM, Aug. 1998, pp. 74-83, vol. 41 No. 8, ACM.

Stop, in the Name of Spam, Communications of the ACM, Nov. 1998, pp. 11-14, vol. 41 No. 11, ACM.

Eric Allman, Spam, Spam, Spam, Spam, Spam, the FTC, and Spam, Queue, Sep. 2003, pp. 62-69, vol. 1 Issue 6, ACM.

Tom Fawcett, "In vivo" Spam Filtering: A Challenge Problem for KDD, SIGKDD Explorations, Dec. 2003, pp. 140-148, vol. 5 Issue 2, ACM.

Fabrizio Sebastiani, Machine Learning in Automated Text Categorization, ACM Computing Surveys, vol. 34 Issue 1, pp. 1-47, 2002.

I. Androutsopoulos, et al., Learning to Filter Spam E-mail: A Comparison of a Naive Bayesian and a Memory-based Approach, 4th PKDD's Workshop on Machine Learning and Textual Information Access, 2000, 13 pages.

Thorsten Joachims, Transductive Inference for Text Classification Using Support Vector Machines, 16th Int'l Conference on Machine Learning, 1999, 10 pages.

Kevin R. Gee, Using Latent Semantic Indexing to Filter Spam, SAC 2003, 2003, pp. 460-464, Melbourne, Florida, USA.

"MIME", The Microsoft Computer Dictionary. 5th ed. Redmond, WA; Microsoft. May 1, 2002.

Michael S. Mimoso, "Quick Takes: Image Analysis, Filtering Comes to E-mail Security", http://searchsecurity.techtarget.com/originalContent.html (Feb. 5, 2002).

"Clearswift Announces the Most Complete e-Policy-Based Email Content Security Product for Service Providers", http://www.clearswift.com/news/item.aspx?ID=144. (Oct. 12, 2002).

* cited by examiner

ADVANCED URL AND IP FEATURES

CROSS REFERENCE TO RELATED APPLICATION

This application is a continuation-in part of U.S. application Ser. No. 10/454,168, entitled *Origination/Destination Features and Lists For Spam Prevention* and filed on Jun. 4, 2003, the entirety of which is incorporated herein by reference.

TECHNICAL FIELD

This invention is related to systems and methods for identifying both legitimate (e.g., good mail) and undesired information (e.g., junk mail), and more particularly to utilizing particular IP address-based and URL-based features as inputs to machine learning filters.

BACKGROUND OF THE INVENTION

The advent of global communications networks such as the Internet has presented commercial opportunities for reaching vast numbers of potential customers. Electronic messaging, and particularly electronic mail ("email"), is becoming increasingly pervasive as a means for disseminating unwanted advertisements and promotions (also denoted as "spam") to network users.

The Radicati Group, Inc., a consulting and market research firm, estimates that as of August 2002, two billion junk e-mail messages are sent each day—this number is expected to triple every two years. Individuals and entities (e.g., businesses, government agencies) are becoming increasingly inconvenienced and oftentimes offended by junk messages. As such, spam is now or soon will become a major threat to trustworthy computing.

A key technique utilized to thwart spam is employment of filtering systems/methodologies. One proven filtering technique is based upon a machine learning approach—machine learning filters assign to an incoming message a probability that the message is spam. In this approach, features typically are extracted from two classes of example messages (e.g., spam and non-spam messages), and a learning filter is applied to discriminate probabilistically between the two classes. Since many message features are related to content (e.g., words and phrases in the subject and/or body of the message), such types of filters are commonly referred to as "content-based filters".

With the onslaught of such spam filtering techniques, many spammers have thought of ways to disguise their identities to avoid and/or bypass spam filters. Thus, conventional content-based and adaptive filters may become ineffective in recognizing and blocking disguised spam messages.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method that facilitate distinguishing between spam and good messages in part by employing filters which have been trained on a plurality of features such as advanced IP address-based, count-based URL features, and/or redirection-based features. More specifically, IP address and/or URL data can be extracted from a message and various characteristics relating thereto can be detected and/or used as inputs when training new filters or updating older ones.

IP addresses represent the location that spam came from and are one of the only parts of a message that spammers cannot fake. However, many IP addresses encountered by a deployed filter are unknown, in that no information about them was available at the time the filter was created. By analyzing reverse DNS lookups and other information, otherwise unknown IP addresses can be better classified. "Path" information—information about the path TCP/IP packets must take over the internet to reach the IP address—can also be analyzed. This information may be more robust than the IP itself.

In yet another aspect of the present invention, a reverse DNS lookup can be performed on an IP address to yield an RDNS (Reverse Domain Name System) entry. A number of different features can be generated from the RDNS entry. Evidence that the address is a cable or DSL or dialup line may be useful, since these IP addresses are rarely sources of good mail. Examples of such evidence include words such as "dsl", "cable", "dialup", or related terms present in the RDNS entry, the length of the RDNS entry and seeing the IP address in the RDNS entry. Other examples can exist as well—all of which will be discussed in greater detail below.

The other part of a message that a spammer cannot fake is the URL that the message directs the user to. However, spammers may attempt to confuse learning systems by embedding irrelevant or deceptive URLs, or by using new hostnames, or by using so-called "redirectors." By properly analyzing these URLs, a system robust to these manipulations can be built. Path information—information about the path TCP/IP packets must take over the internet to reach the machine hosting the URL—can be analyzed here as well. Similarly, this information may be more robust than the URL itself.

Hence, another aspect of the present invention involves performing analysis of the one or more URLs detected in a message. A plurality of URL-related features such as total-based features (appending to each URL the total number of URLs in the message), sequence-based features (appending to each URL the number indicating where it appears in the message relative to other URLs), and/or combination-based features can also be used as inputs when training new filters or updating older ones. Furthermore, a count of URLs in the message can be employed as a feature.

In yet another aspect of the invention, several features can be created from redirectors and used as inputs to the training technique or system employed. For example, the presence of a redirector, the second URL found in the redirector, and/or the length of a URL in the redirector can all be used as individual features. Multi-level redirection and n-gram analysis of the URLs in the redirectors can also yield additional features.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
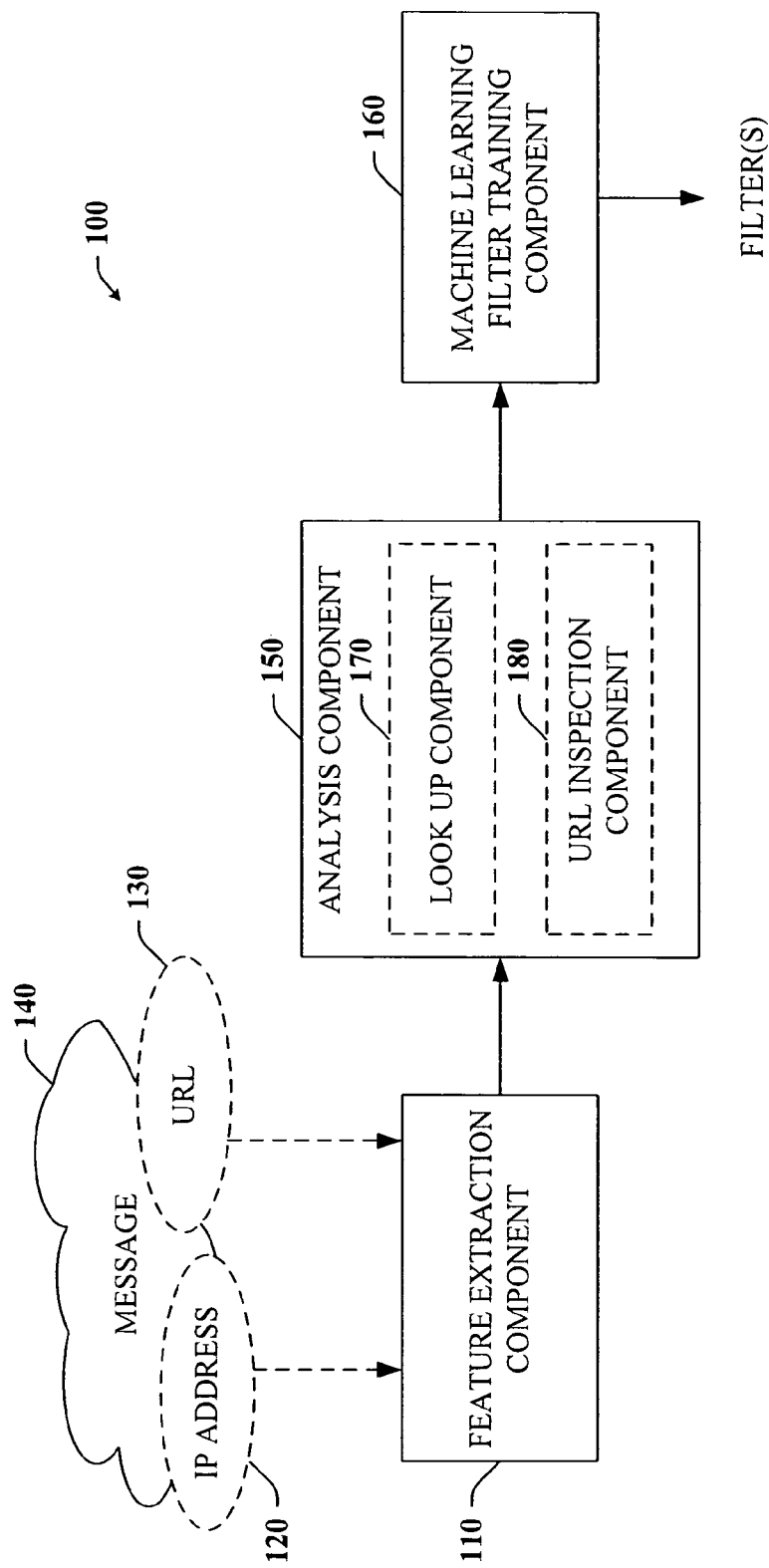
FIG. 1 is a high-level block diagram of a filter training system that can facilitate the training of filters by IP address-based and/or URL-based features derived from a message in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating training data for machine learned spam filtering, for example. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that although the term message is employed extensively throughout the specification, such term is not limited to electronic mail per se, but can be suitably adapted to include electronic messaging of any form that can be distributed over any suitable communication architecture. For example, conferencing applications that facilitate a conference or conversation between two or more people (e.g., interactive chat programs, and instant messaging programs) can also utilize the filtering benefits disclosed herein, since unwanted text can be electronically interspersed into normal chat messages as users exchange messages and/or inserted as a lead-off message, a closing message, or all of the above.

In the subject invention, the term "recipient" refers to an addressee of an incoming message. The term "user" refers to a recipient who makes use of messaging programs as well as filtering systems to detect and prevent spam.

Referring now to FIG. 1, there is illustrated a system 100 that facilitates building and training filters for use in spam detection. The system 100 comprises a feature extraction component 110 that can detect and extract at least one of IP addresses 120 and URLs 130 found in a message 140. An analysis component 150, coupled thereto, can examine the extracted data and then determine which portions thereof can be used as features or inputs to a filter training component 160. In an alternative configuration of the system 100, it should be appreciated that the analysis component 150 can be a sub-component of the feature extraction component 110.

Figure 4:
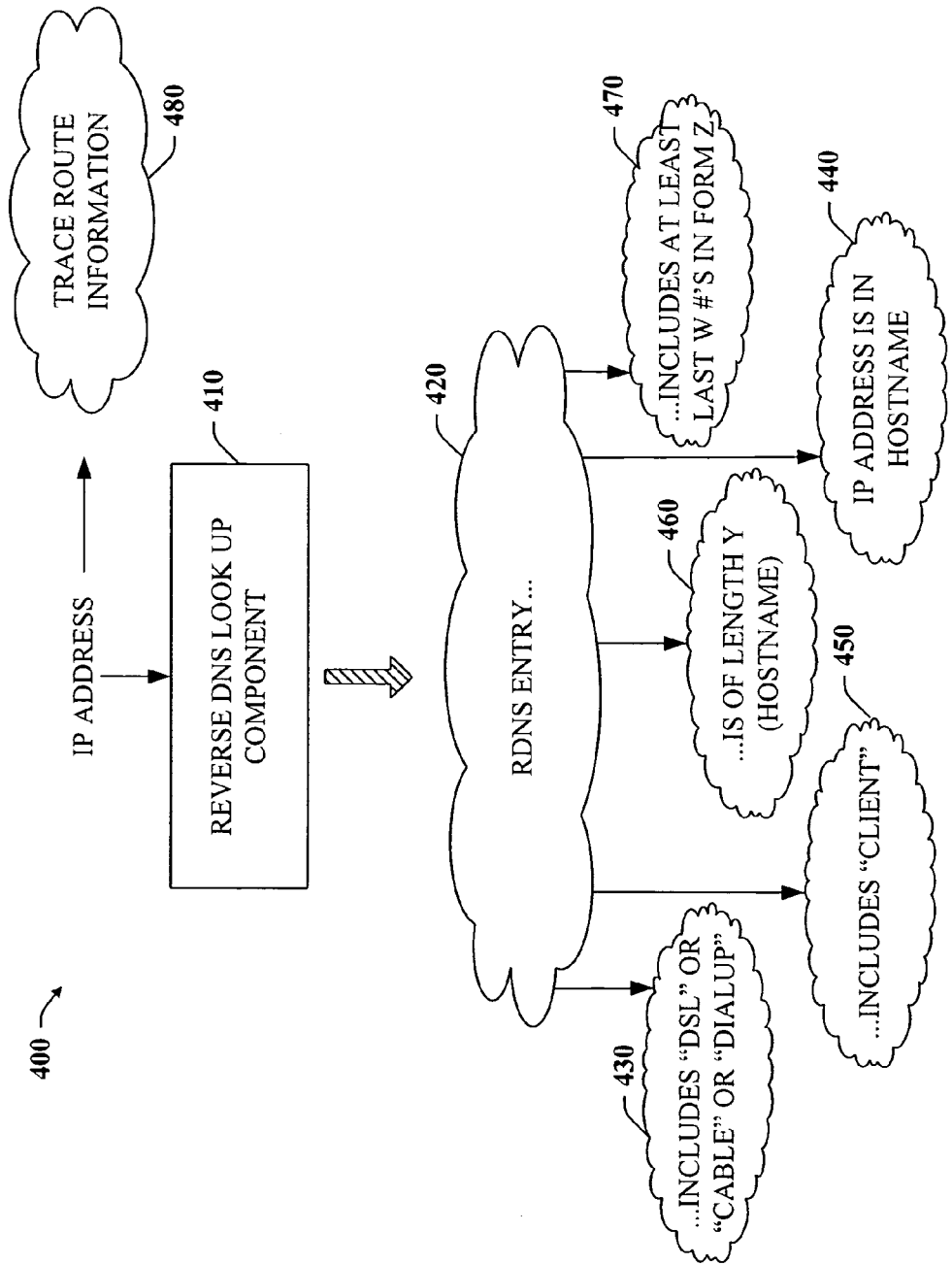
FIG. 4 is a schematic diagram illustrating types of features which can be obtained from an RDNS entry for use in building or training filters in accordance with an aspect of the present invention.

In particular, the analysis component can include a lookup component 170 that can perform reverse-DNS lookups on an IP address to ascertain the domain name of the respective IP address. Upon performing the reverse-DNS lookup, a number of features can be created from the resulting domain name. FIG. 4, infra, discusses this in greater detail.

The analysis component 150 also comprises a URL inspection component 180 that can examine URLs extracted from messages to facilitate generating features associated therewith that may be indicative of either spam or good messages. Both IP address-based and URL-based features extracted from the message 140 can be communicated to the filter training component 160. The filter training component 160 can make use of machine learning techniques to train one or more filters using the generated features. Hash or match based techniques can also be used to train the one or more filters.

Figure 2:
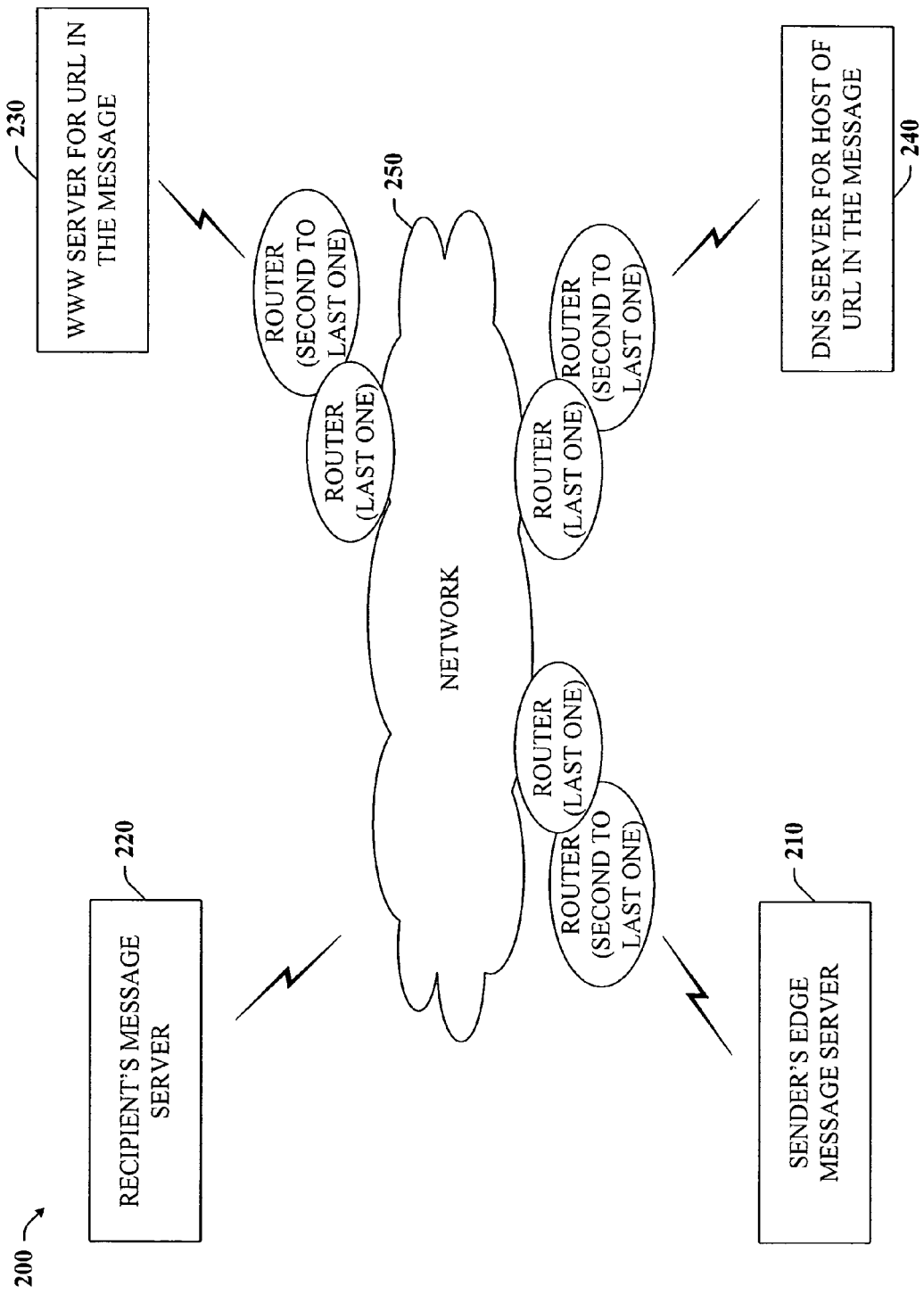
FIG. 2 is a block diagram of an exemplary pathway demonstrating the movement of a message from a sender to a recipient in which IP address or URL information can be in accordance with an aspect of the present invention.

Now referring to FIG. 2, there is illustrated a schematic diagram 200 demonstrating an abstract view of a message flow on an internet network. For example, a sender's edge message server 210, a recipient's message server 220, a WWW (web) server 230 for a URL in the message, and a DNS server 240 for host of URL in the message can communicate with one another by way of a network 250. Various routers can also be employed to facilitate communication between the sender's edge message server 220 and the network 250, between the web server 230 and the network 250 as well as between the DNS server and the network 250. It should be appreciated that these routers are not unique and that any given commutation between these entities (210, 230, 240) can take different paths through the network 250 (internet). These paths may sometimes involve using different routers for one or both of the last two hops to the sender's edge message server 210, the WWW server 230, and the DNS server 240.

More specifically, IP addresses can be added to a message header at various points along a message delivery pathway (between a message sender and a message recipient), and thus may affect the message's treatment by a spam filter. One or more filters can be strategically placed along the pathway to catch spam before it reaches the recipient's inbox.

The internet is usually referred to as a monolithic network. However in reality, it comprises routers that are connected to each other (and other components). Messages can go from a sender's computer, over one router, then the next, then the next, etc. until it reaches the destination computer, which in this case is a mail or message server. The mail then flows from the mail server to the mail client.

The flow of information through routers is not recorded in email. Routers do not modify the information that pass through them. This is sometimes a confusing point with respect to email, in particular. Email can pass sometimes from one server to another server. When passing from mail server to mail server, a line giving the server IP address is added to the email, so the flow between servers is typically recorded. However, each mail server (but not router) can modify this information in any way desired. Thus, only the IP address of the last mail server external to the organization can be trusted—any previous server may have modified the information, or a spammer may have inserted false IP addresses into the headers before sending the message.

Note that the path (through routers) taken from an external server to a first recipient server is not recorded. However, the IP address of the last server before the first recipient server is recorded. This is the IP address detected in the message and the one that can be used for reverse DNS information and for tracerouting. Although the path information is not recorded, it is possible to use a traceroute operation to explicitly derive at least one path between two IP addresses. In general, there may be many alternate paths through the internet between any two computers. The last several hops to a computer should vary less than the middle hops and at the very least should narrow in on a geographic location where the computer is located.

The traceroute operation refers to a tool that can send trace packets for determining information. In particular, this tool can trace the route of UDP packets for the local host to a remote host. The traceroute can also display the time and location of the route taken to reach its destination computer. After the relevant IP address is determined, a traceroute can be performed, determining the last one, two, or more routers used to reach the sender's external server. Information obtained by way of the traceroute can be used to train filters such as spam filters.

In some cases, servers are left "open"—so called open relays. These servers can be used by anyone to relay mail, and are often abused by spammers. Thus, in some cases, the address of an open relay can actually be found—not the spammer's computer—and then tracerouting to the open relay can be performed—not to the spammer.

A URL contains a hostname—e.g., a.b.c.com. However, such a hostname may not be used directly to receive a web page. The first step to fetching a web page is to find the IP address that this host computer resides on. This is done by contacting the DNS server for the hostname. The DNS server is contacted over the internet, and the route to this DNS server may be found via a traceroute. The DNS server passes back to the spam filter the IP address corresponding to the hostname. Again, there is typically no direct connection between the spam filter computer and the computer indicated by the IP address of the host in the URL. Instead, there is a connection going through multiple routers, and a path through these routers can be determined via the traceroute operation.

Figure 3:
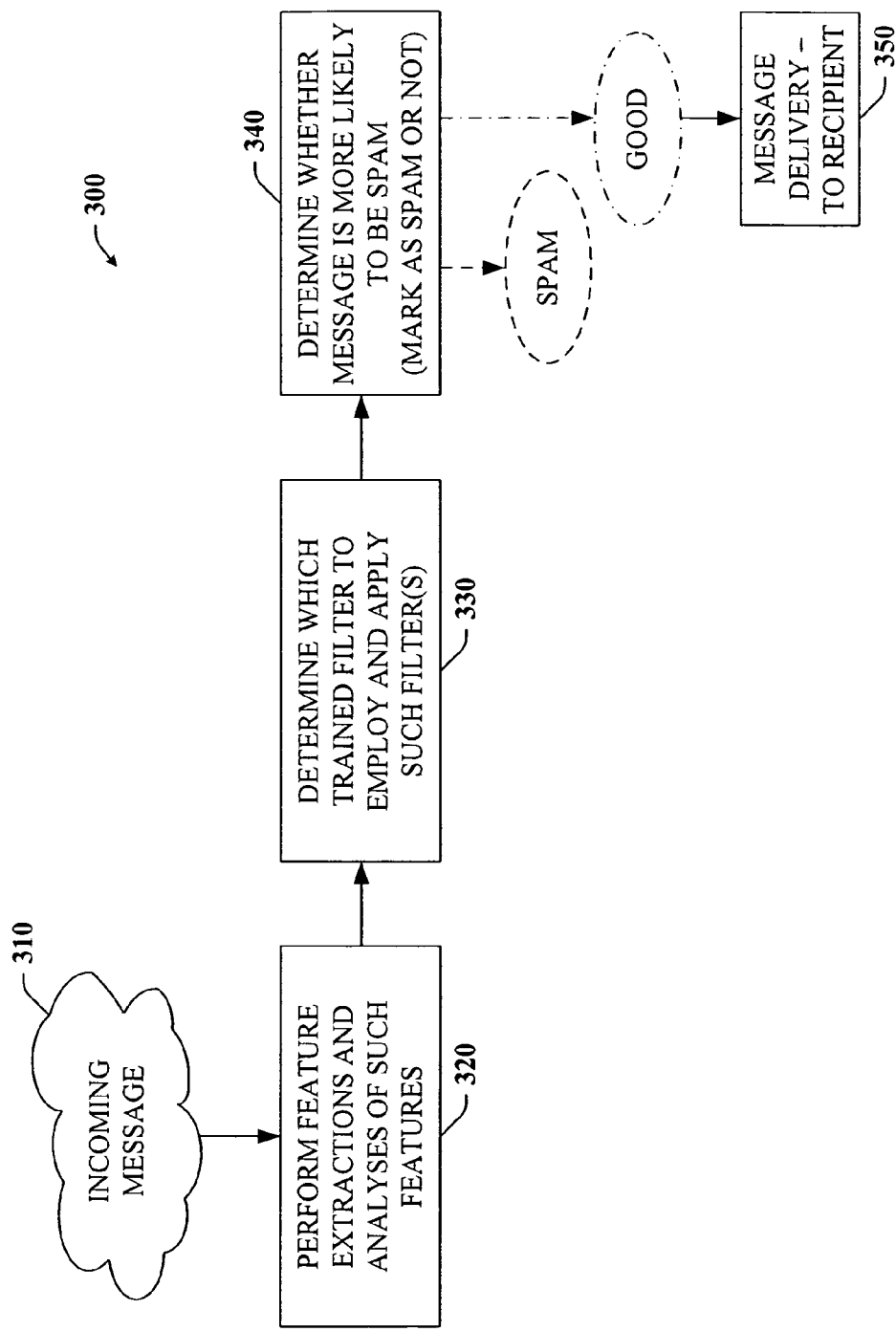
FIG. 3 is a block diagram of an exemplary pathway that a user can take to follow a URL that originates from a message of an exemplary method for training at least two separate machine learning filters that are independent of the other in accordance with an aspect of the present invention.

Referring now to FIG. 3, there is illustrated a schematic diagram 300 that depicts the employment of one or more trained filters to detect spam among new incoming messages. The diagram 300 represents receipt of an incoming message 310. Various features can be extracted from the message and then analyzed (320) to determine which trained filter(s) to employ and apply (330). For example, if URL-based features are extracted from the message, then a filter trained on at least URL-related features can be utilized. Subsequently, the message can be filtered or marked as spam or good, depending on the filtering results. Good messages can be passed on to the recipient or the recipient's inbox via a delivery component 350.

Turning now to FIG. 4, there is illustrated a schematic diagram 400 of the various types of features that can be generated from a reverse-DNS lookup of an IP address according to an aspect of the present invention. The IP address is perhaps the most powerful single feature of a message. It cannot be forged, it gives the source of the message, and it tends to be very predictive. Because of this, spammers have recently begun using more and more advanced techniques to get a hold of other IP addresses, including infecting machines with viruses and trojans. They then use these viruses or trojans to send spam. Thus, the IP address of the message may be the IP address of an infected machine. There may be many thousands of such machines, with new infections happening all the time. Consequently, it may be difficult to learn about all possible infections.

For a given IP address, we can attempt to generalize in several ways. One good technique may be to use the top 16 or top 24 bits of the IP address (or some other arbitrary number). Since IP addresses are usually distributed and/or sold in blocks, especially blocks that share the same top m bits, this can be an effective way to learn about groups.

Another technique we can use is to perform a Reverse-DNS lookup on an IP address. Note that the person who controls the machine at an IP address may not control the reverse DNS address entry for that IP address. For instance, a home computer user may have an infected computer sending spam via a cable modem or DSL line. It is his internet provider that controls the reverse DNS address entry for the IP address of the cable/DSL line. The spammer controls the computer, but not the DNS entry. Even a spammer who controls a DNS server may not control the reverse DNS address entries for the computer. Even in the case where a spammer does control the DNS entry for the computer a common technique is to perform a reverse DNS lookup and then perform a DNS lookup on the resulting RDNS entry; if the two lookups do not match there is good evidence that the DNS server is miss-configured or compromised and any information from it can be discounted.

Reverse DNS address entries are configured in a slightly different way than regular entries, and often one must have a large number of IP addresses (256) in order to control the reverse DNS address entries. In some cases, reverse DNS address entries are left blank, or missing. In this aspect of the present invention, the text of a present IP address can be analyzed by way of a reverse DNS lookup component 410. This involves more than simply checking if the address is NULL, or if it contains other strings, such as DSL. Rather, the null and/or the name return in the non-null information can be taken and used as inputs to a learning algorithm.

In some cases, the reverse DNS address may be missing or empty, symptomatic of a poorly configured mail or DNS server, or a mail server which the owner did not intend the IP address to be used for sending mail. Unlike conventional filters that simply check for such missing/empty reverse DNS entries, one aspect of the present invention involves careful analysis using machine learning of the reverse DNS address entry, when present. It can be used in several ways. One way to use this information is to use the hostname from the reverse DNS address as a feature to a machine learning spam filter. The host name can also be "rolled up." For example, if the hostname from the reverse DNS lookup is a.b.c.d.e we can use features like a.b.c.d.e#rollup0, b.c.d.e#rollup1, c.d.e#rollup2, d.e#rollup3, e#rollup4. Alternatively, the rollup indicator from the feature id can be omitted and simply features such as a.b.c.d.e, b.c.d.e, c.d.e, d.e, and/or e can be used instead.

Today, approximately ⅔ of spam appears to be originating from computers infected with "trojans" or virus-based open proxies. With trojans, spammers can send spam by sending viruses to computers. Once a virus attacks, it can open a program to send its spam via an unsuspecting user. These computers are typically connected to the internet via DSL or cable modems. It may be difficult or expensive to get a definitive list of DSL and cable modem lines. However, individual reverse DNS addresses can be analyzed for evidence of being a DSL or cable modem line. For instance, many such reverse DNS addresses contain the IP address embedded or at least partially embedded in the reverse DNS entry. Also, the reverse addresses tend to be unusually long, typically a length or depth of 4 or 5. For instance, a.b.c.d.com has a depth of 5.

The following examples demonstrate some of the many characteristics that can be detected in an RDNS entry 420:
  ads1-156-144-228.owb.bellsouth.net for 66.156.144.228
    Notice the presence of "dsl" in the name (430). Also notice that the last three numbers in the IP address are part of the hostname for the reverse IP address (440).
  ZB097136.ppp.dion.nejp for 219.125.97.136
    Notice that the last two numbers in the IP address are present in the hostname for the reverse IP address (440).
  c-67-173-136-133.client.comcast.net for 67.173.136.133
    Notice that all four parts of the IP address are present in the reverse IP address (440). Also, notice the word "client" (450).
  c-24-129-220-181.se.client2.attbi.com for 24.129.220.181
    Notice that all four parts of the IP address are present in the reverse IP address (440). Also, notice the word "client" (450).
  0-1pool122-12.nas11.nashville1.tn.us.da.qwest.net for 65.136.122.12
    Notice that the last two numbers in the IP address are present in the hostname for the reverse IP address. Also notice the word "pool." Also notice the unusual length of the hostname—8 levels deep (460).
  0×50a41711.albnxx14.ads1-dhcp.tele.dk for 80.164.23.17
    Notice that the hexadecimal encoding of 80.164.23.17y is 50a41711, which is present in the hostname (440). Also, notice the letters DSL present in the hostname (430).
  roc-66-67-211-123.rochester.rr.com for 66.67.211.123
    Notice that the IP address is present in the hostname (440).

Thus, by examining the reverse DNS address, substantial evidence that the address is a cable, dialup, DSL, or similar type line can be found. This sort of analysis can be performed by hand or by programming heuristics, for instance. Alternatively, these kinds of questions can be employed as inputs to a machine learning spam filter. For instance, some exemplary features include "RDNS entry contains 'dsl'" 430 or "RDNS entry contains 'pool'" or "RDNS entry contains at least last w numbers in IP address in form x" 470 where w ranges over 1 to 4 and x ranges over decimal, octal, and hexadecimal. Furthermore, features like "RDNS entry is of length x" can also be generated. Other evidence of the following heuristics can be used as features as well: user, dyn, tele, cust, dial., dialin, dsl, client, pool, modem, cable, ppp, dialup, and/or dhcp. Furthermore, some strings may be indicative of not being from an infected computer including mail, smtp, and mx. Additional strings can be found in part by looking at the RDNS information from a plurality of training messages and then by putting substantially every sub-string of the entry into a hash table along with the number of times it occurs in spam and good messages. Sub-strings that have extreme distributions (e.g., almost all good or almost all spam) can then be readily detected. Moreover, reverse DNS entries or portions thereof may be helpful for a variety of spam filtering techniques, including hash-based techniques, matching-based techniques, and probabilistic techniques.

Still, there are many spammers that do not use the trojan or virus attacks which are or may be highly illegal and unethical. Instead, a spammer may attempt to deceive a spam filter that uses IP addresses by acquiring a large number of IP addresses. However, it is easier to acquire a diverse range of IP addresses than it is to acquire a diverse number of connections to the internet. "Traceroute" information 480 can be employed to learn about the path that a spammer uses to connect to the internet. By looking at the last and the second-to-last hops, etc., the route that the spam is taking can be learned. For example, it can be found that much spam follows a common route. Thus, features can be generated for each of these steps.

Figure 5:
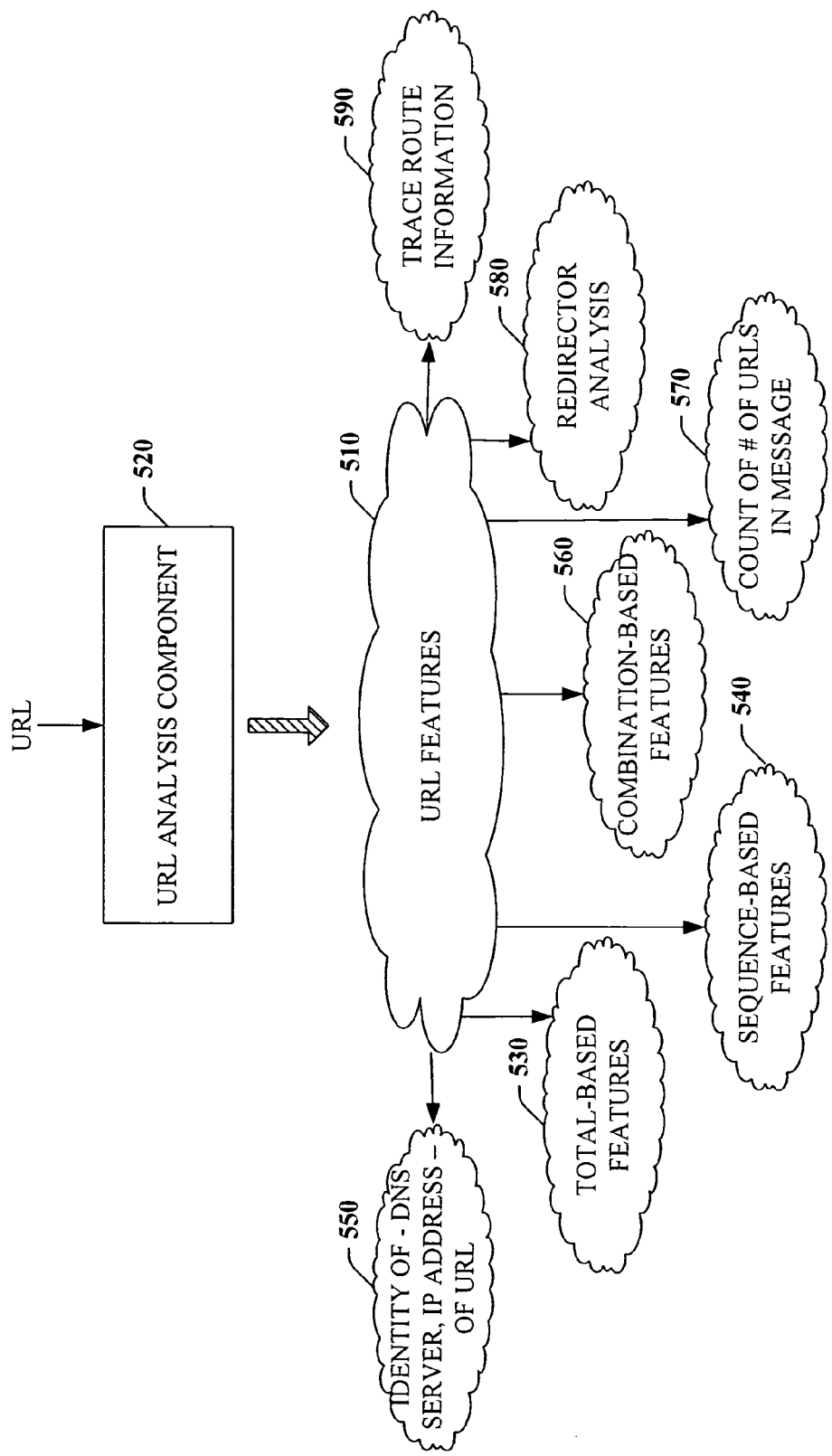
FIG. 5 is a schematic diagram illustrating types of features which can be obtained from URL(s) for use in building or training filters in accordance with an aspect of the present invention.

Referring now to FIG. 5, there is illustrated a schematic diagram that depicts various URL features 510 which can be generated or derived from analyzing a URL found in a message by way of a URL analysis component 520. One approach involves extracting parts of URL features to use them as individual features. For instance, in a message with URLS like http://www.example.com/ and http://www.example2.com/ we might have features for www.example.com and www.example2.com. These can be called "absolute URL features."For URL features, spammers may attempt to deceive machine learning filters by including both good URLs that belong to other people, as well as ones they control. For example, a spammer may include Amazon.com somewhere in its message because it may be known as a good or "safe" URL. Certain model types, such as linear models, may be deceived by this. In order to mitigate this hijacking, count-based and combination-based URL features can be included as inputs to the machine learning filter.

There are two types of count-based features: total-based features 530 and sequence-based features 540. In a total-based feature 530, the number of distinct URLs (or distinct portions of URLs, e.g., the number of distinct fully qualified domain names) can be tracked. If there are two URLs, e.g., http://www.example.com/ and http://www.example2.com/, then we might have features for www.example.com#2 and www.example2.com#2, where the "#2" indicates that there are a total of two distinct URLs in the message. Consider a URL like Microsoft.com that tends to be good, but also tends to occur alone in a message without other domains. When used in good messages, there can be a feature like www.microsoft.com#1 (since there may be no additional domains) and the feature can get a large good weight (550). When used by spammers in combination with their domains, there may be two features: www.microsoft.com#2 (which might have a weight of 0) and www.spammer.com#2 (which might have a large bad weight.) An alternative is sequence based features 540. In this case, URLs that use the first domain in a message get 1; URLs that use the second domain in a message get 2; etc. So, for example, a message containing URLs for, in order, www.microsoft.com and www.yahoo.com and www.spammer.com can have features www.microsoft.com#1 and www.yahoo.com#2 and www.spammer.com#3. This prevents a spammer from throwing in a huge number of different good URLs. Additionally, these different feature types can be used in combination. Total-based features can be used in combination with sequence-based features and/or in combination with absolute URL features.

Another alternative or addition is to include URLs in combinations 560. For instance, all pairs of URLs in a message can be included as potential features, or the only feature could be the set of URLs present in the message, so that for a message with URLs www.microsoft.com and www.yahoo.com and www.spammer.com, the feature might be www.microsoft.com#www.yahoo.com#www.spammer.com. This would allow valid common combinations to be learned as good, while invalid combinations abused by spammers would not be so used.

Finally, the count of the number of distinct domains 570 in a message can be employed as a feature. For instance, most mail with no domains listed is good; a large portion of mail with one domain listed is spam; a relatively large portion of mail with 5 or more domains listed is good. Each of these can be used as a feature. In addition, open and/or closed redirectors 580 as discussed, in FIG. 6, infra, as well as the traceroute information 590 as described, supra, can be employed as features as well.

Figure 6:
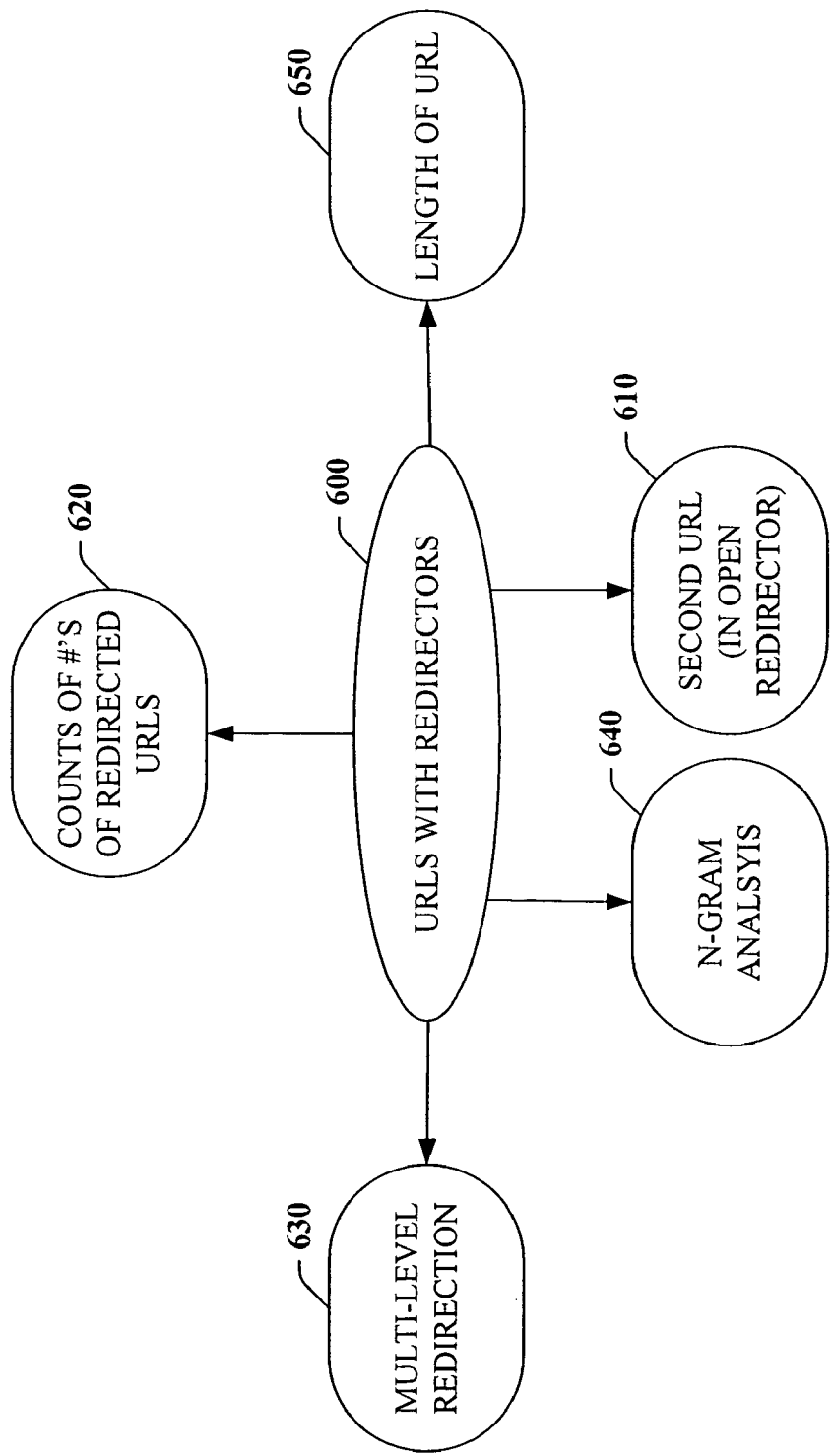
FIG. 6 is a schematic diagram illustrating types of features which can be obtained from redirectors detected in messages for use in building or training filters in accordance with an aspect of the present invention.

As shown in the schematic diagram of FIG. 6, multiple features can be created from URLs with redirectors. The detection or presence of redirectors in messages can be a danger sign indicative of spam. In general, redirectors operate in the following manner and typically exist for advertising reasons: company A advertises on behalf of companies X, Y, and Z. Company A wants to know when a user has clicked through on an ad for company X, Y, or Z which should bring the user to X, Y, or Z's website. In order to record this click-through, company A creates a URL such as http://a.com/redirect?http://x.com. This brings the user to company A's website, where the click-through is recorded (so that company X can be appropriately charged). Company A then returns a special code redirecting the browser to X's website.

Ideally, a company would make sure that only redirection to company X, Y, or Z was allowed. However, some companies will allow redirection to any website, e.g., http://a.com/redirect?http://evilspammer.com. These can be referred to as open redirectors. Spammers may then take advantage of these open redirectors. For example, a spammer may believe that a.com is considered to be good, so the spammer uses the a.com redirector but inserts their spam webpage as the target page. An examination of the URL can reveal that the URL is a link to a.com but then is redirected to a spammer. Closed redirectors only permit approved URLs to be redirected. Thus, closed redirectors and their respective redirected URLs can be readily learned as spam or good.

There is no universal form for redirectors. However, most redirectors may include an "http:" (or "https:") in the website. By detecting URLs 600 that contain a second "http:" or "https:" the redirectors can typically be detected. More complex techniques can search for URLs with substrings that match the form for a valid hostname, perhaps preceded by an "&" or "?", which can be characters often used in form submission. This detection should typically happen after otherwise decoding the URL (e.g., converting specially encoded characters to standard form).

Once the redirectors have been detected, they can be used in numerous ways. In particular, the redirected URLs or portions 610 thereof can be employed as inputs to a machine learning spam filter. The machine learning filter may be discriminatively trained. Additionally, the fact that a redirector is present can be a feature as well as the count of numbers of redirected URLs 620 in the message can be a feature. Because some URLs can be bad when used in conjunction with a redirector but good when used alone, such URLs should be noted or treated differently when training a machine learning filter. For example, consider a.com. When used alone and/or not in a redirector, its usage as such might almost always indicates a good message. However, when a.com is used as a redirector, it might almost always be indicative of spam.

Furthermore, some spammers use multi-level redirection 630 such as, for example:

http:www.a.com/redirect?http://www.b.com/redirect?http://evilspammer.com. Such multilevel redirection 630 should probably never occur in good mail. The presence of such multi-level redirection can also be utilized as input to a machine learning spam filter.

Note that some URLs are generated at random. Thus, analysis (e.g., n-gram analysis 640) on these URLs may be helpful. Other analysis, such as the length of the URL 650, may also be helpful. This information can be used as, for instance, input to a machine learning spam filter.

Spammers may create very many hostnames cheaply. However, these hostnames can share many attributes. We can examine the process of getting data from a URL and see what the commonalities are. In particular, the first step is a DNS lookup for the URL. Spammers may have only a single DNS server for multiple hostnames. As a result, the identity of the DNS server may be a valuable feature to a spam filter. A spammer may have multiple DNS servers, but they may reside nearby on the network. Thus, a traceroute of the path to the DNS server may provide valuable information. The DNS server may be of a specific favored type. Version information about the DNS server may be valuable information. Next, using the DNS server, the hostname can be converted to an IP address. If the various hosts created by the spammer reside on the same server, they should or can have the same IP address. Thus, the IP address or portions thereof may be a valuable feature for a spam filter. The IP address must be contacted over the internet. By performing a traceroute on the IP address, we may find that many IP addresses are connected in a similar way.

Spammers are also using a new technique in which they use a set of compromised computers to serve their content. This can be accomplished at least in part by controlling a DNS server to return an IP address for a different one of their compromised computers for each lookup of the URLs hostname. Information about the fact that such a hostname resolves to a different IP address on each request can also be used. Alternatively or in addition, a reverse DNS lookup on the IP returned for the host in the URL can be performed. Finally, whether this RDNS information matches the host in the URL may be employed as an input to our decision process.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 7:
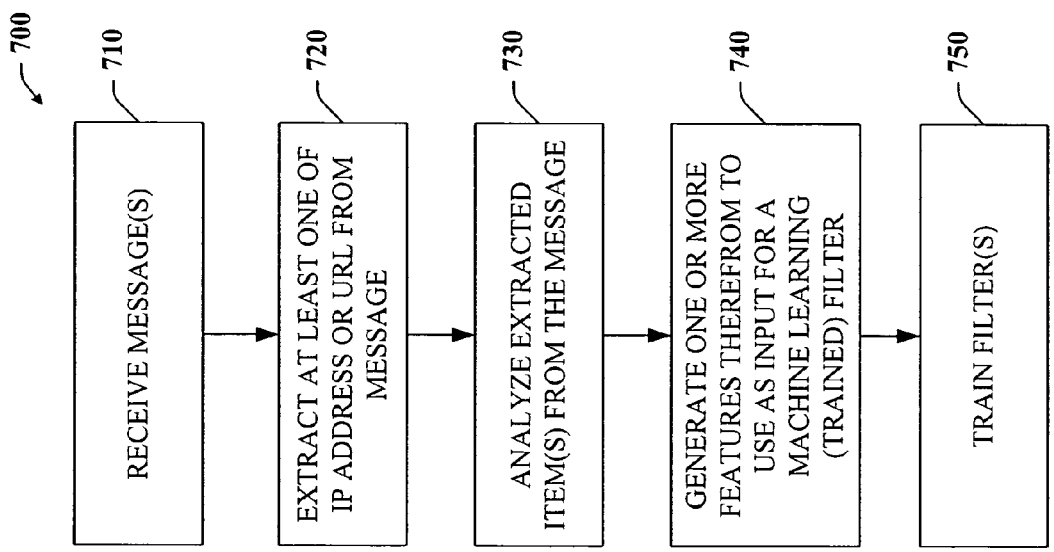
FIG. 7 is a flow diagram of an exemplary method that facilitates building or training filters using machine learning techniques in accordance with an aspect of the present invention.

Referring now to FIG. 7, there is illustrated a flow diagram of an exemplary method 700 that facilitates training filters for use in spam detection and prevention. The method 700 comprises receiving incoming messages at 710 and extracting at least one of IP address-based or URL-based data that is detected from the messages at 720. At 730, the extracted data can be analyzed. For example, an IP address can be analyzed in part by a reverse-DNS lookup component to determine the domain name corresponding thereto. Likewise, any URLs detected in the message can be analyzed as well. Following such analyses, one or more features can be generated therefrom at 740 to be used as inputs or training data for a machine learning filter, for example. The training of the filters at 750 can also be hash-based or match-based as well.

Figure 8:
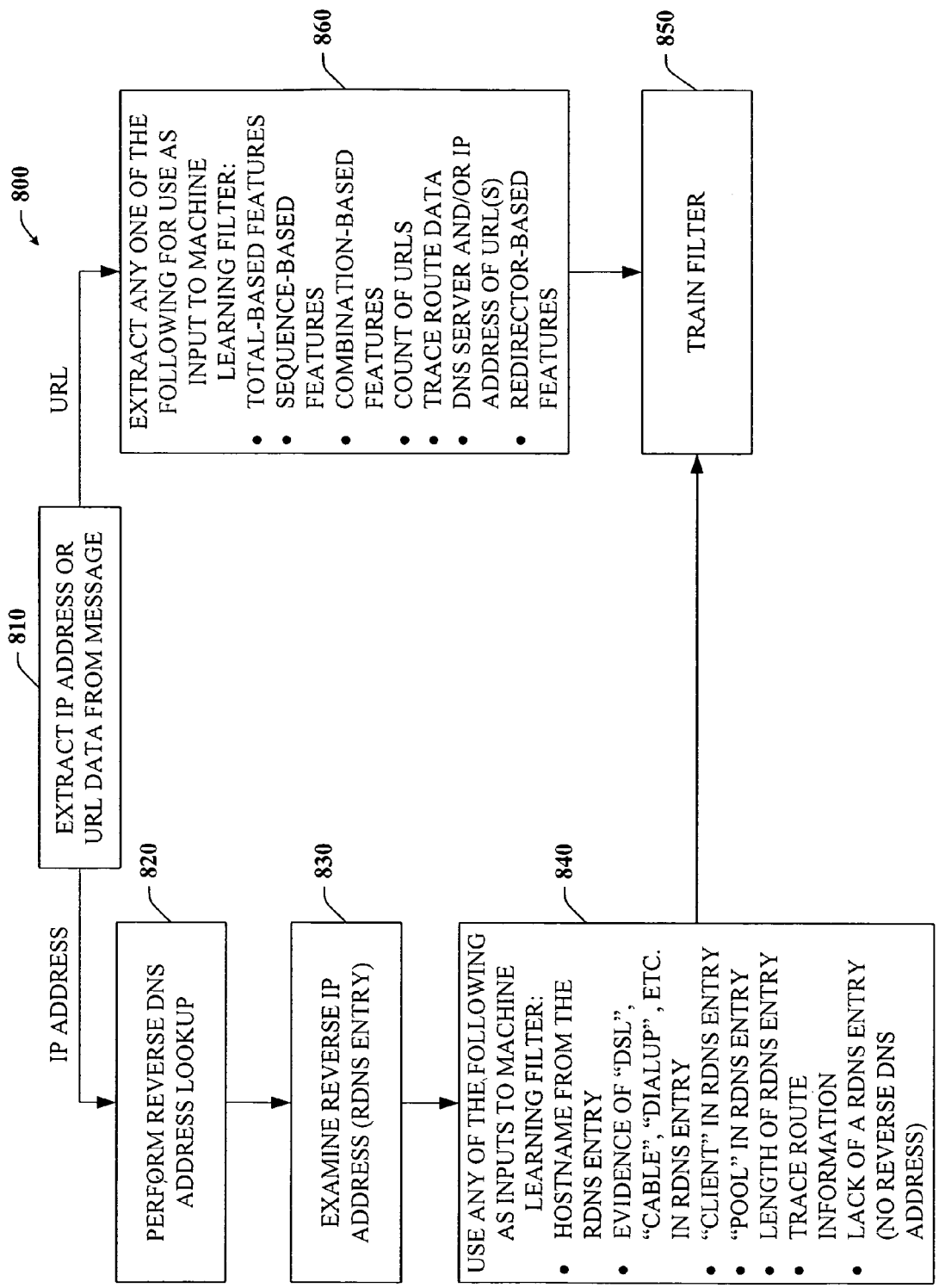
FIG. 8 is a flow diagram of an exemplary pathway of treatment for IP addresses and URLs to generate features that can be used to build or train filters in accordance with an aspect of the present invention.

Referring now to FIG. 8, there is illustrated a flow diagram of an exemplary method 800 that facilitates generating advanced IP address and URL features in accordance with an aspect of the present invention. The method 800 comprises extracting an IP address or URL detected in a message at 810. Regarding the detection of the IP address, a reverse-DNS lookup can be performed at 820 and the reverse domain name entry (RDNS entry) can be examined at 830. The examination of the RDNS entry can reveal a plurality of characteristics which can be used as inputs to a machine learning filter, for example. For instance, at 840, at least one of the following can be used as features associated with the RDNS entry and can be employed as input: the hostname from the RDNS entry; evidence of "dsl", "cable", "dialup", "client", and/or "pool" in the RDNS entry; the length of the RDNS entry; traceroute information; and/or the lack of the RDNS entry (missing domain name). One or more filters can be trained at 850 such as by using machine learning techniques.

When one or more URLs are detected in a message, at least one of the following parts of any URL can be extracted therefrom and utilized as individual features at 860 to a machine learning filter as well: total-based features (track total number of distinct fully qualified domain names in a message); sequence-based features (URLs that use the first domain in a message get 1; . . . that use a second domain in a message get 2, etc.); combination-based features (all URLs in a message make up one feature or all pairs of URLs are each a feature, etc.); count of URLs in a message (most messages with 0 URLs are good but most messages with 1 URL are spam but most messages with 5 or more URLs are good); traceroute information; DNS server and/or IP address of the URLs; and/or redirector-based URL features. Following, the one or more filters can be trained at 850.

Figure 9:
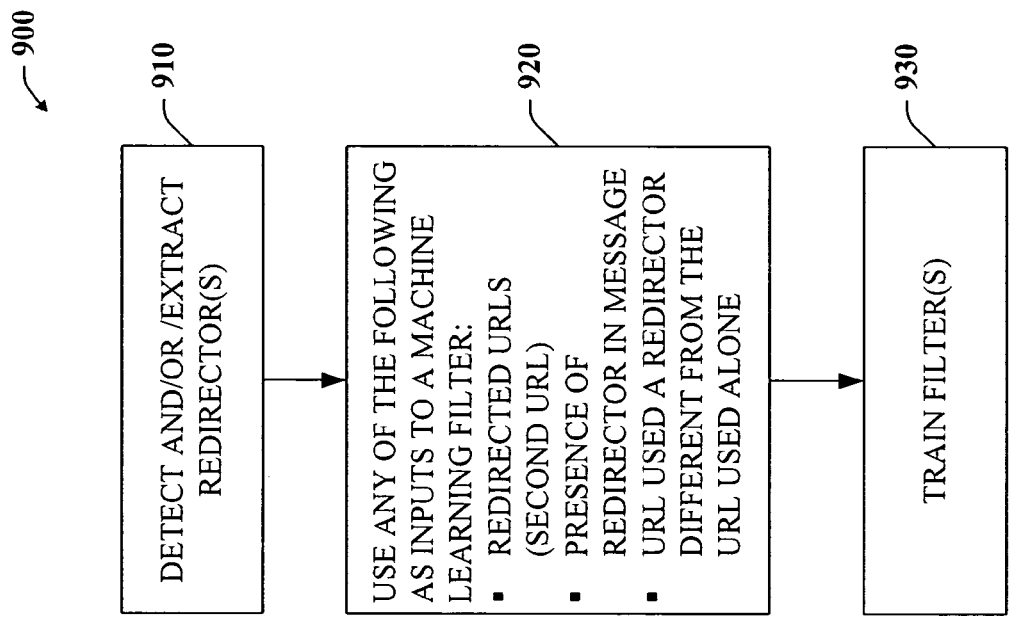
FIG. 9 is a flow diagram of an exemplary method that facilitates redirector detection and generating features therefrom in connection with building or training filters in accordance with an aspect of the present invention.

Turning now to FIG. 9, there is illustrated a flow diagram of an exemplary process 900 that facilitates generating features from redirectors detected in a message according to an aspect of the present invention. The process can comprise detecting and/or extracting one or more redirectors found in a message at 910. At 920, the second (or redirected) URL can be used as a feature or input, the mere presence of a redirector in the message can be used as a feature; and/or URLs used as a redirector compared to the same URLs used alone (e.g., http://a.com/redirect?http://evilspammer.com—used as a redirector compared to www.a.com—used alone). Subsequently, one or more filters can be trained with any one of the above features using machine learning techniques at 930.

Figure 10:
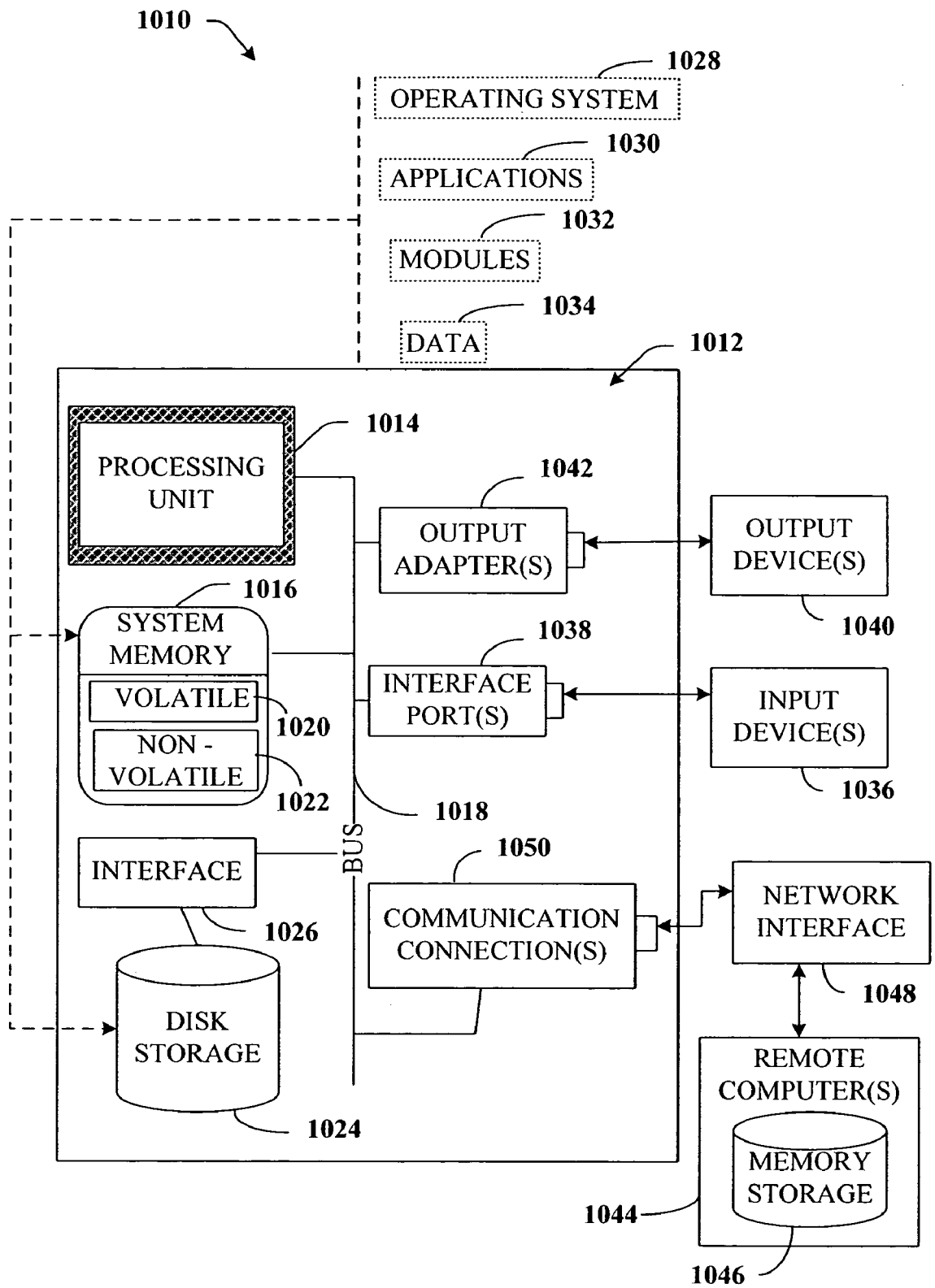
FIG. 10 is a schematic block diagram of an exemplary communication environment in accordance with the present invention.

In order to provide additional context for various aspects of the present invention, FIG. 10 and the following discussion are intended to provide a brief, general description of a suitable operating environment 1010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples the system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer readable storage medium having stored thereon computer executable components that facilitate spam detection the components comprise:
    a component that receives an item and extracts a set of features associated with an origination of a message or part thereof and/or information that enables an intended recipient to contact, respond to, or act on the message, the features comprising at least one of IP address-based features and URL-based features, wherein the IP address-based features comprise at least one of presence of reverse DNS entry or domain name, hostname from the reverse DNS entry and missing reverse DNS entry;
    an analysis component that analyzes at least a subset of the features; and
    at least one filter that is trained on at least a subset of the features to facilitate distinguishing spam messages from good messages, wherein the filter is trained by analyzing at least a portion of the IP address-based data at least in part by taking null reverse DNS information and using a null RDNS entry as input into a machine learning algorithm.

2. The storage medium of claim 1, the at least one filter is trained to analyze text of a present reverse DNS address lookup.

3. The storage medium of claim 2, the filter is a machine learning filter.

4. The storage medium of claim 2, the filter is a hash-based or match-based filter.

5. The storage medium of claim 2, the analysis component examines a reverse DNS entry to determine whether evidence of at least one of a DSL line, cable modem line or dialup line is included in the reverse DNS entry or to find other evidence that the computer that sent the message is one that should not be sending such messages.

6. The storage medium of claim 2, the analysis component examines a reverse DNS entry that corresponds to an IP address detected in the message to determine whether at least one of "dsl", "cable", "dialup", "client", "pool", "user", "dyn", "tele", "cust", "dial", "dialin", "modem", "ppp", "dhcp", "mail", "smtp", and/or ".mx" appears in the DNS entry to facilitate identifying the message as spam or good.

7. The storage medium of claim 1, the IP address-based features comprise at least one of the following:
   length of the reverse DNS entry;
   depth of the DNS entry; and
   presence of at least a portion of IP address in the hostname of the reverse DNS entry in clear form or encoded in octal or hexadecimal.

8. The storage medium of claim 1, the URL-based features comprise at least one of the following:
   one or more absolute URL features;
   one or more count-based URL features;
   one or more combination-based URL features; and
   any combination of at least two of absolute URL features, count-based URL features, and combination-based URL features.

9. The storage medium of claim 8, the count-based URL features comprise total-based features and sequence-based features.

10. A computer implemented spam detection and filtering system comprising the following components executed on a processor:
   a component that uses traceroute to gather additional IP address or URL feature information about at least one message; and
   a filtering component that employs the traceroute information to facilitate distinguishing between spam and good messages, wherein the filter is trained by analyzing at least a portion of the IP address-based data at least in part by taking null reverse DNS information and using a null RDNS entry as input into a machine learning algorithm.

11. The system of claim 10, the filtering component comprises a machine learning filter.

12. The system of claim 10, the filtering component comprises any one of a hash-based filter or a match-based filter.

13. The system of claim 10, the traceroute is a traceroute of the IP address that the message was received from.

14. The system of claim 10, the traceroute is a traceroute of the IP address of a URL contained in the message.

15. The system of claim 10, the traceroute is a traceroute of the IP address of the DNS server of a URL in the message.

16. A computer implemented spam detection and filtering system comprising the following components executed on a processor:
   a component that receives an incoming message; and
   a filter that employs any combination of at least two of absolute URL features, count-based URL features, and combination-based URL features detected in a message to facilitate determining whether the message is spam.

17. The system of claim 16, the URL-based inputs depend on a total number of URLs detected in the message.

18. The system of claim 16, the filter treats any one URL detected in the message based in part on the number of distinct URLs or portions of URLs that precede or follow it in the message.

19. The system of claim 16, the filter combines any number of URLs detected in the message into one or more subsets for use as inputs to facilitate distinguishing between spam and good messages.

20. The system of claim 16, the filter is any one of the following:
   a machine learning filter;
   a hash-based filter; and
   a match-based filter.

21. A computer implemented spam detection and filtering system comprising the following components executed on a processor:
   a component that receives an incoming message;
   a component that detects URLs and redirected URLs; and
   a machine learning filter that employs at least a portion of one or more redirected URLs detected in a message as inputs to facilitate determining whether the message is spam.

22. The system of claim 21, the machine learning filter is discriminatively trained with respect to URLs and redirected URLs or portions thereof.

23. The system of claim 21, the machine learning filter employs counts of numbers of redirected URLs as inputs.

24. The system of claim 21, the component further detects multilevel redirection to be used as an input to the machine learning filter.

25. A computer implemented spam detection and filtering system comprising the following components executed on a processor:
   a component that detects URLs in a message;
   a contact process component comprising at least one of the following contact routes: URL detected in the message including at least one of an IP address of the URL, a DNS server of the URL, a traceroute of the IP address of the host of the URL, an IP address of the DNS server of the URL, version information of the DNS server, and the traceroute of the IP address of the DNS server; and
   a machine learning filter component that employs at least one of the contact routes to facilitate determining whether the message is spam, wherein the filter is trained by analyzing at least a portion of the IP address-based data at least in part by taking null reverse DNS information and using a null RDNS entry as input into a machine learning algorithm.

26. The system of claim 25, the filter component employs the contact process comprising the IP address of the URL.

27. The system of claim 25, the filter component employs the contact process comprising the DNS server of the URL.

28. A spam filtering method comprising:
   extracting at least one of IP address-based data and URL-based data from a message, wherein the IP address-based data comprising at least a portion of an IP address and the URL-based data comprising at least a portion of at least one URL;
   generating at least one of IP address-based features and the URL-based features from the respective data to be used as inputs to at least one filter; and
   employing at least one filter trained on at least a subset of the inputs to facilitate distinguishing spam messages from good messages, wherein the filter is trained by analyzing at least a portion of the IP address-based data at least in part by taking null reverse DNS information and using a null RDNS entry as input into a machine learning algorithm.

29. The method of claim 28, the filter is a machine learning filter.

30. The method of claim 28, further comprising analyzing data returned from a reverse DNS lookup by taking non-null information comprising a name return and using the name return as an input to a machine learning algorithm to train a filter.

31. The method of claim 28, the IP address-based features comprising at least one of the following:
   presence of reverse DNS entry or domain name;
   length of reverse DNS entry;
   hostname from the reverse DNS entry;

missing reverse DNS entry;
presence of at least a portion of IP address in the hostname of the reverse DNS entry; and
evidence of any one of "dsl", "cable", "dialup", "client", "pool", "user", "dyn", "tele", "cust", "dial.", "dialin", "modem", "ppp", "dhcp", "mail", "smtp", and/or ".mx" in the DNS entry.

32. The method of claim 28, the URL-based features comprising at least one of the following:
one or more absolute URL features;
one or more count-based URL features;
one or more combination-based URL features;
any combination of at least two of absolute URL features, count-based URL features, and combination-based URL features;
redirected URLs; and
presence of multilevel redirected URLs.

33. The method of claim 28, further comprising performing a traceroute to obtain additional IP address or URL features for use as inputs to the filter.

34. A spam detection and filtering method comprising:
receiving incoming messages;
examining a contact process of obtaining data from a URL to determine commonalities among a plurality of hostnames to facilitate generating features, wherein examining the contact process comprises at least one of:
performing a DNS lookup for the URL,
identifying identity of DNS server,
obtaining traceroute of a path from the URL to the DNS server,
identifying version information of DNS server,
converting a hostname to an IP address using the DNS server,
identifying at least a portion of the IP address and
performing a traceroute on the IP address to determine whether the IP addresses are connected in a similar way; and
employing at least one filter trained at least in part on at least a subset of the features to facilitate determining whether messages are spam.

35. A computer implemented spam filtering system comprising the following components executed on a processor:
means for extracting at least one of IP address-based data and URL-based data from a message, wherein the IP address-based data comprising at least a portion of an IP address and the URL-based data comprising at least a portion of at least one URL;
means for generating at least one of IP address-based features and the URL-based features from the respective data to be used as inputs to at least one filter; and
means for employing at least one filter trained on at least a subset of the inputs to facilitate distinguishing spam messages from good messages, wherein the filter is trained by analyzing at least a portion of the IP address-based data at least in part by taking null reverse DNS information and using a null RDNS entry as input into a machine learning algorithm.

36. A computer-readable storage medium containing a data structure adapted to be transmitted between two or more computer processes facilitating improved detection of spam, the data structure comprising: information associated with generating at least one of IP address-based features and the URL-based features from respective data to be used as inputs to at least one filter; and employing at least one machine learning filter trained on at least a subset of the inputs to facilitate distinguishing spam messages from good messages.

* * * * *